UNITED STATES PATENT OFFICE.

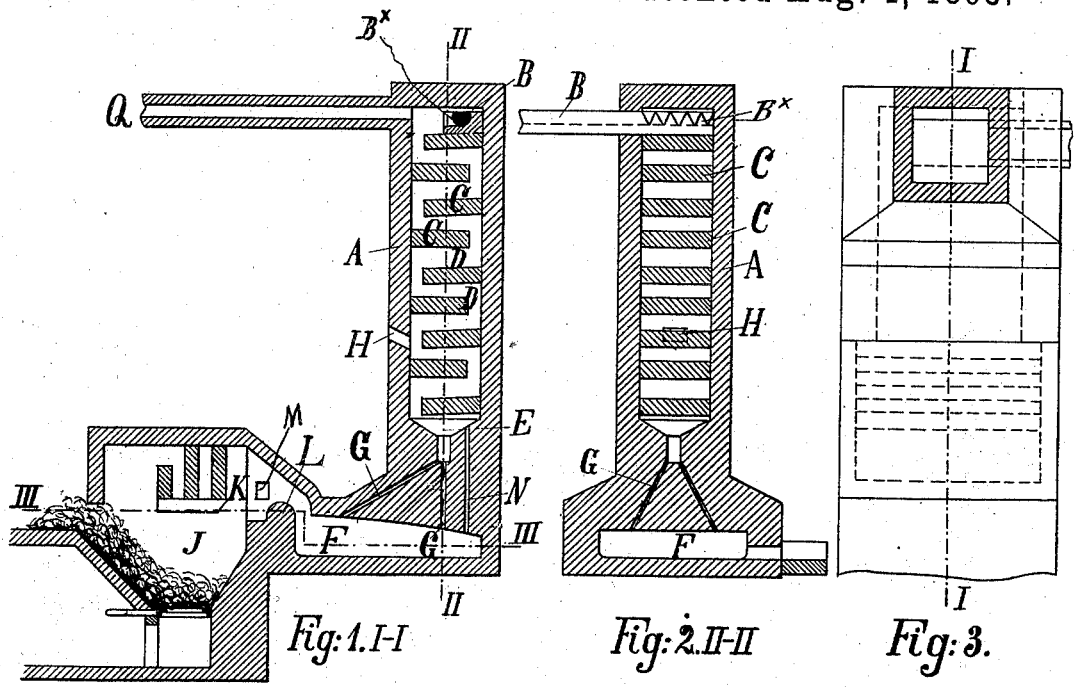

HEINRICH HÖFER, OF HAGEN, GERMANY.

PROCESS OF REFINING IRON AND APPARATUS USED THEREFOR.

SPECIFICATION forming part of Letters Patent No. 502,492, dated August 1, 1893.

Application filed July 16, 1892. Serial No. 440,288. (No model.) Patented in Germany September 16, 1891, No. 62,879; in France October 3, 1891, No. 216,582, and in Belgium March 15, 1892, No. 74,671.

*To all whom it may concern:*

Be it known that I, HEINRICH HÖFER, a subject of the Emperor of Germany, residing at Hagen, Westphalia, Germany, have invented certain new and useful Improvements in Processes of Refining Iron and Apparatus Used Therefor, (for which I have received Letters Patent in Germany, No. 62,879, dated September 16, 1891; in France, No. 216,582, dated October 3, 1891, and in Belgium, No. 74,671, dated March 15, 1892;) and I do hereby declare that the following is a full, clear, and exact description of the invention, which will enable others skilled in the art to which it appertains to make and use the same.

In order to reduce the pig iron coming from the blast furnace direct into foundry iron, steel of different quality or into wrought iron, into "refined iron," that is to say into a product containing more or less carbon and being therefore suitable for different purposes and manufactures, I proceed as follows: The fluid metal coming from the blast furnace is carried direct in a channel into a refining furnace specially built to suit the refining process invented by me; in this furnace I lead the metal in a thin stream, which extends over the whole width of the furnace, upon slightly inclined steps arranged in zigzag, one below the other, so as to leave alternately a passage on one side and then on the other, and forming on the whole a serpent-like channel with continuous falls or cataracts, in consequence of which the flow of the metal is retarded a little upon each step and turned up that is to say stirred up or wallowed; this stirring up or wallowing causing a little retardation in the current and then it flows to the next step until it is gathered in a hearth or crucible at the bottom. In opposite direction to the stream of the fluid metal I let pass a stream of gas which, depending upon the quality of iron to be produced and also upon the composition of the pig iron, is made to contain more or less carbon or oxygen. In consequence of the regular change of flow and of the fall from step to step of the fluid metal stream being crossed by the stream of gas, I attain a repeated and an intimate mixing of the iron and the gas, and the iron is freed from impure substances and is refined, an oxidizing and a reducing reaction taking place which can be regulated at will. At certain intervals of the zigzag channel I arrange openings in the furnace in order to be able to introduce flux with the object of regulating and varying the quality of the refined product. The reducing and oxidizing gases and the required hot air are produced in a separate generator and heated in a furnace of any suitable design for the purpose. A regenerative furnace is recommended. The gas and air enter into the furnace at the opposite side of the hearth where the refined iron is let off, so that they flow over the metal and cross it also here and they enter then in a separate channel from the bottom into the zigzag channel which they traverse from bottom to top, always crossing the stream of metal, as said before, and leaving the furnace at the top, where the fluid iron coming from the blast or another smelting furnace enters the refining furnace.

The furnace I have designed for the purpose is shown on the accompanying drawings. It will serve to explain the above described process still more.

Figure 1 is a vertical section along line I—I of Fig. 3. Fig. 2 is a section along line II—II of Fig. 1. Fig. 3 is a plan partly in section. Fig. 4 is a horizontal section along line III—III of Fig. 1.

The furnace consists of the upright part A, which I call the cataract; from this at its top, a feeding channel B leads to the smelting furnace for the pig iron and conducts the fluid metal thence into the refining furnace, where it falls over the dented upper edge ($B^\times$) in order to be spread and distributed over the whole width of the furnace, in a thin broad stream and then it falls from step C to step C along the passages D, D forming a zigzag channel between the steps and between their edges and the surrounding walls. At the bottom E forming an inverted cone or pyramid it is led by several channels G into the hearth F. At one or more places I arrange openings H, which may be closed by suitable doors and through which I am enabled to introduce flux.

The gases are produced in a generator I, arranged before the hearth. From this generator the gas is led into the mixing chamber K and over the bridge L into the hearth. In the mixing chamber an air channel M is arranged, through which heated air can be blown in, so as to provide the gases with oxygen, as may be required and to regulate the ratio of oxygen to carbon in the gas. In the hearth the gases flow over the iron coming from G and they enter into the cataract by a separate channel N into the pyramidal part E and thence they go up through the zigzag channel up to the top where they escape by an outlet channel Q.

A damper may be placed in the gas outlet channel for regulating the current of the gas.

The refined product is let out of the hearth by an outlet channel R at the bottom.

Having now fully described my invention, what I claim, and desire to secure by Letters Patent, is—

1. In refining iron the process which consists in leading the fluid metal in a thin stream through a zigzag channel forming cataracts and in causing the reducing and heating gases to pass also through the said channel in opposite direction along and through the metal stream.

2. The furnace consisting of a vertical part A having a feeding channel B, alternately arranged steps C and passages between their open edge and the corresponding wall of the furnace, the metal channels G leading from the bottom E of the upright part A into the hearth F below the said part A, and the gas channel N making a communication between the upper space in the hearth and the space below the lowest one of the steps C, in combination with a gas generator I placed in front of the hearth F.

HEINRICH HÖFER.

Witnesses:
CAM. ESSENWEIN,
RUDOLPH FRICKE.